Patented May 10, 1932

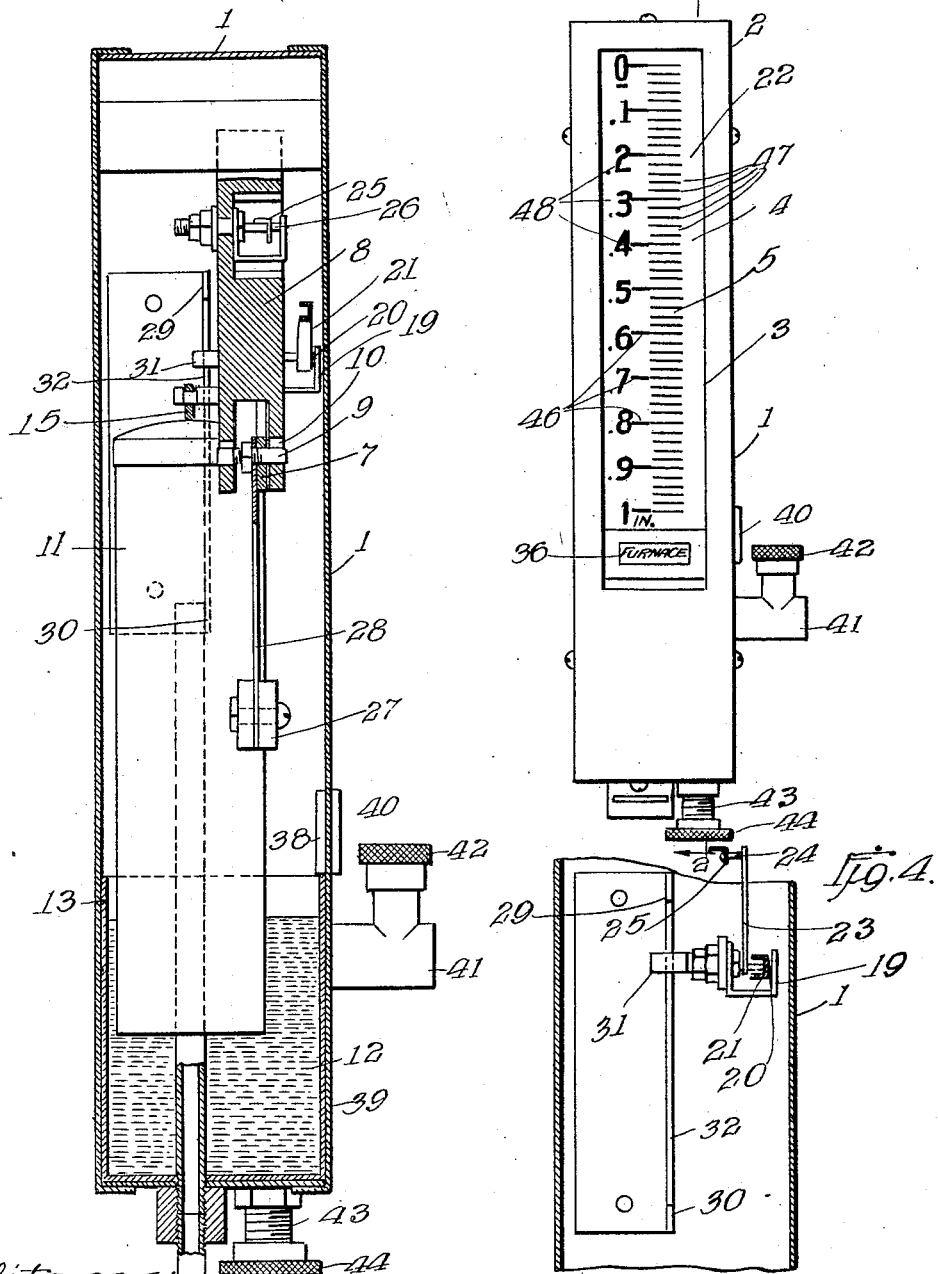

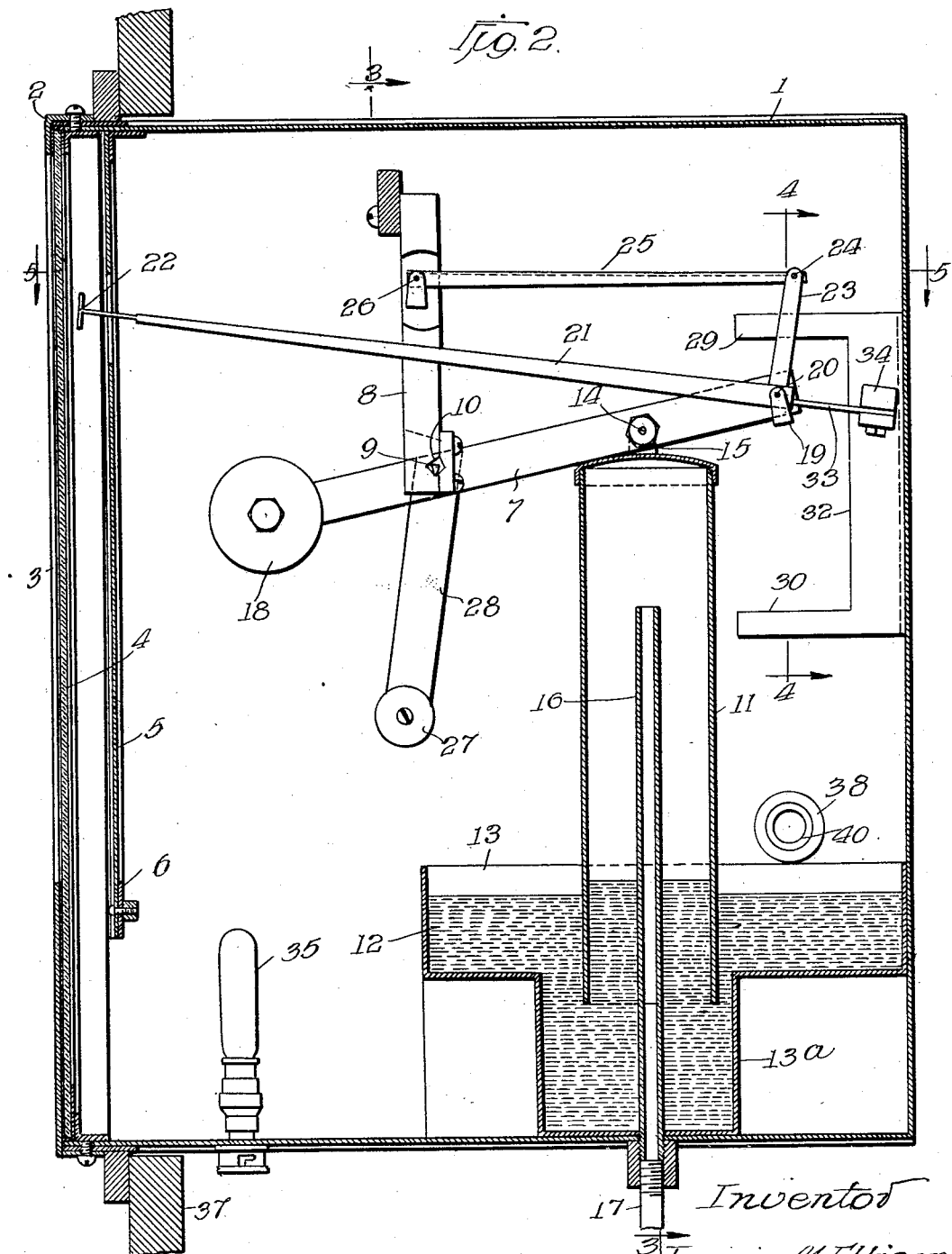

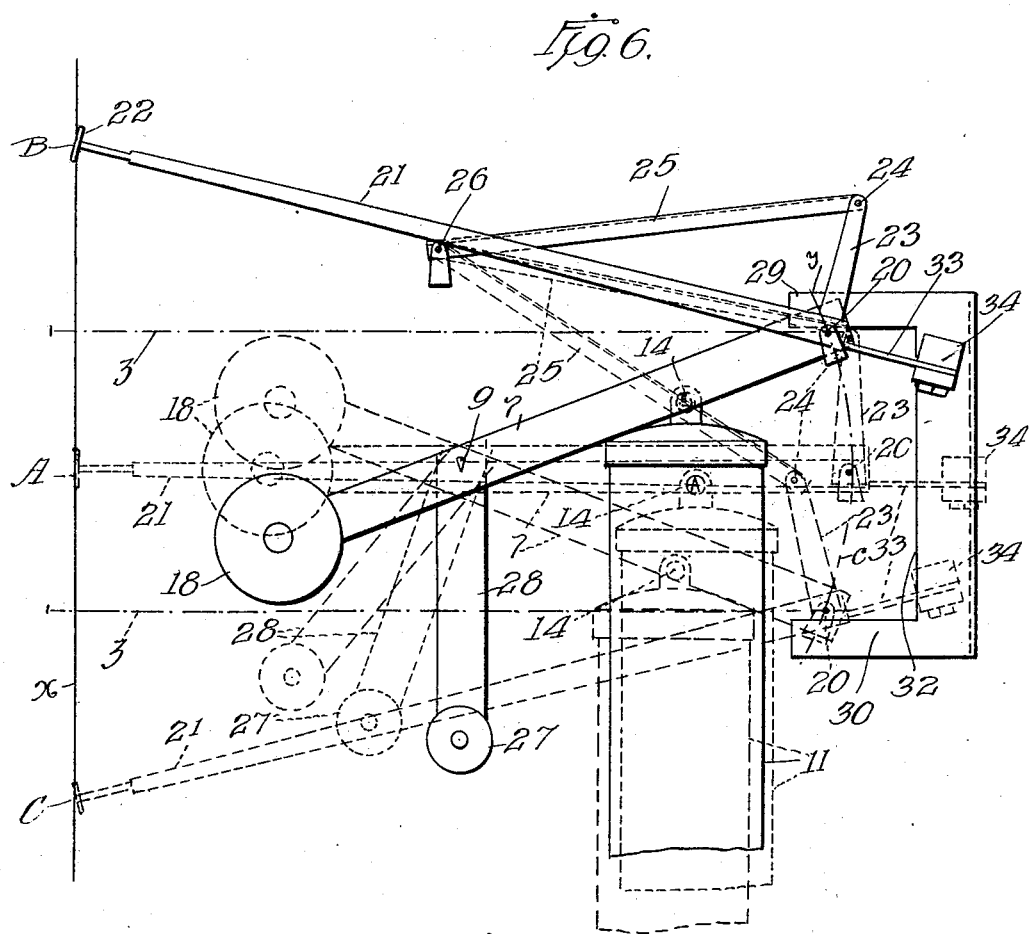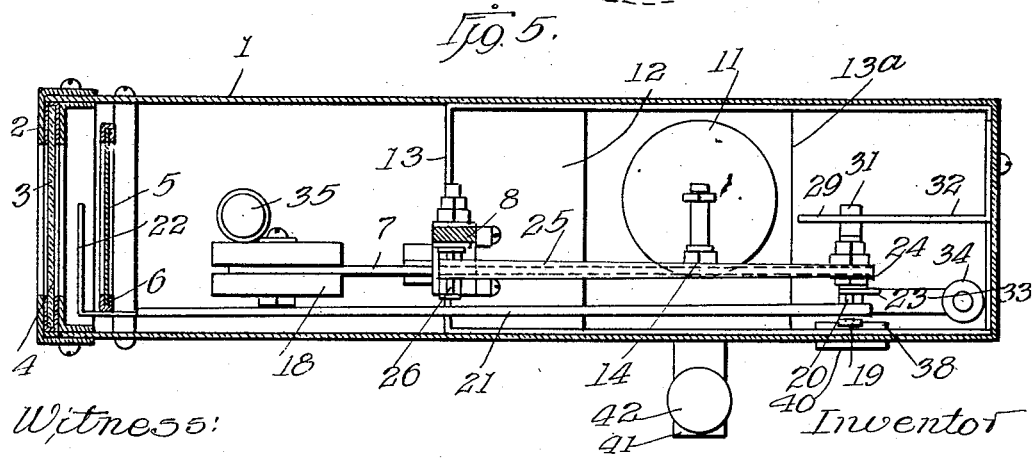

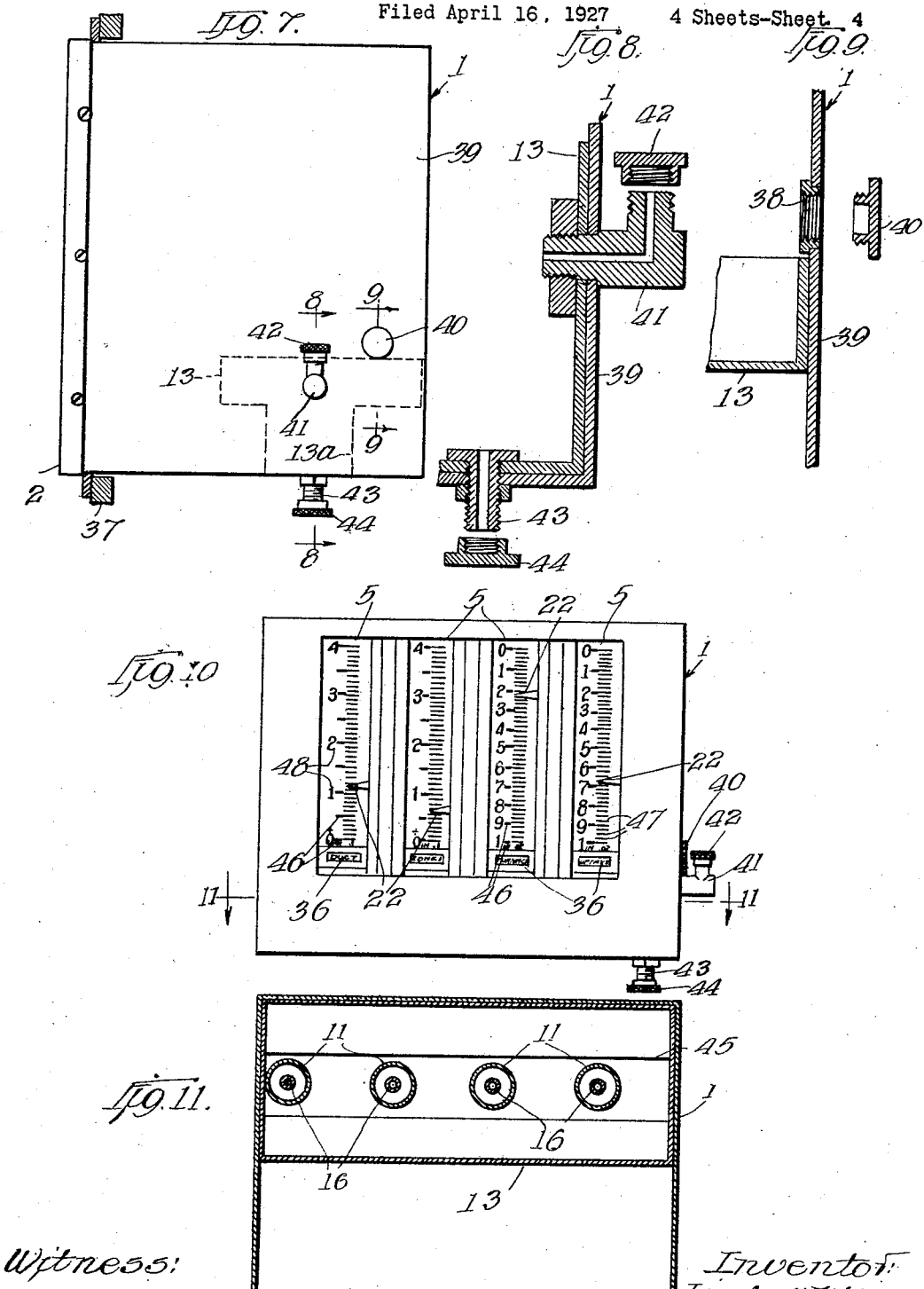

1,857,367

UNITED STATES PATENT OFFICE

LEWIS M. ELLISON, OF CHICAGO, ILLINOIS

PRESSURE INDICATOR

Application filed April 16, 1927. Serial No. 184,265.

My invention relates to improvements in draft indicators for furnaces.

The main object of my invention is to provide a mechanism which converts the arcuate movement of the main operating lever of the device into a straight line movement for the pointer back and forth along its scale, thereby enabling the indicator to be easily and accurately read, which is not the case with the curved scales as heretofore employed with pointers which have an arcuate movement.

Another object of my invention is to multiply the movement of the pointer with respect to that of the main operating lever so that the scale for the pointer may have its graduations far enough apart to be read from a distance.

A further object of my invention is to graduate the scale for the pointer with the major graduations projecting out beyond the line of the minor or sub-graduations, so that the index figures or other characters marked on the scale for the major graduations may be made relatively larger and thus increase the visibility of the scale and enable it to be conveniently and easily read even from a distance.

A still further object of my invention is to make the lower portion of the tank or receptacle for the liquid for the gasometer bell which may be used to actuate the main lever of the device, smaller in its lower portion than in its upper portion so as to reduce to the minimum the amount of liquid required for the receptacle.

A further object of my invention is to employ a single tank or receptacle for the liquid for all the bells of a multiple unit device, and thus reduce the cost of the construction and also have but a single filling opening and a single drain for the receptacle which is common to the bells of all the units.

One way of producing the straight line movement for the pointer is to employ in connection with the main operating lever a link movement which compensates for the arcuate movement of the lever and changes it into a straight line movement at the pointer.

A further object of my invention is to provide a reliable indicator which is simple in construction and operation as well as being strong in construction yet sensitive enough in its operation as to be accurate over the range of all its movements.

My invention also resides in the mechanical movement which is employed in the indicator to obtain a straight line movement for one part from an arcuate movement of another part.

The invention consists further in the matters hereinafter described and claimed.

In the accompanying drawings—

Fig. 1 is a front elevational view of a single unit draft indicator constructed in accordance with my invention;

Fig. 2 is an enlarged vertical sectional view taken on line 2—2 of Fig. 1;

Fig. 3 is a vertical sectional view taken on the indirect line 3—3 of Fig. 2;

Fig. 4 is a fragmentary vertical sectional view taken on line 4—4 of Fig. 2 to show a detail of structure;

Fig. 5 is a horizontal sectional view taken on line 5—5 of Fig. 2;

Fig. 6 is a diagrammatic view illustrating the movement of the indicator mechanism;

Fig. 7 is a side view of the indicator;

Figs. 8 and 9 are enlarged vertical sectional views taken on lines 8—8 and 9—9, respectively, of Fig. 7;

Fig. 10 is a front or face view of a multiple unit indicator of my invention; and Fig. 11 is a horizontal sectional view taken on line 11—11 of Fig. 10.

The indicator of my invention has an outside box-like casing 1 preferably made of sheet metal and constituting a housing and support for the operating mechanism of the device. The casing 1 has top and bottom walls and upright marginal walls, the front wall 2 having a vertically extending sight opening 3, over which is secured a glass or other transparent plate 4 through which a scale 5 may be seen. The scale 5 preferably consists of a strip of translucent material, as celluloid, held vertically straight in a frame 6 suitably supported in the casing 1 to the rear of the glass plate 4. The scale 5 is suitably graduated, as on the decimal system from "0" to 1 inch. The system of graduation employed will conform to the pressure conditions to be indicated by the gage and will be arranged as may be desired.

The operating mechanism within the casing 1 is arranged to operate in a vertical plane to the rear of the scale 5 and is constructed as follows. A lever 7 is pivoted between its ends to the lower end of a vertical bracket 8 fixed in the casing 1 and extending above the lever, as shown in Figs. 2 and 3. The lower end of the bracket is bifurcated or otherwise slotted to receive the lever 7 and the latter carries a pivot pin 9 extending horizontally on opposite sides of the lever and supported in openings or recesses 10, 10 in the bifurcated portions of the bracket. The pin 9 has knife edge bearings in the recesses 10 so as to reduce operating friction and make a sensitive mechanism.

A gasometer bell 11 is suspended from the rear portion of the lever 7, that is, the portion on the side of the bracket 8 opposite the scale 5. Said bell 11 is closed at its top and has its open lower end liquid sealed by extending down into a body of liquid 12, such as oil, in a tank 13 located in the casing 1 beneath the bell, as shown in Fig. 2. A stud 14 projects from one side of the lever 7 to receive an eye 15 on the top of the bell, whereby the latter may be hung on the lever. The stud 14 is reduced adjacent its outer end and is shaped to provide an upwardly extending knife edge bearing for the eye 15 and thus provide a friction reducing pivotal connection between the lever 7 and the bell. (See Fig. 3.) A pipe 16 extends upward through the bottom of the tank 13 into the bell 11 and rises above the maximum level of the liquid in the lower end of the bell. Said pipe 16 has its upper end open into the bell, and its lower end, which is outside of the casing 1, is connected by a conduit 17 with the space, draft chamber, or flue, the pressure in which it is desired to have indicated.

A counter-weight 18 is on the front end of the lever 7, that is, the end nearest the scale 5, so as to balance the dead weight of the bell 11 which is hung from the rear portion of said lever. The rear end of the lever 7 extends beyond the bell 11 and there carries a rigid U-shaped bracket 19 in which is mounted a horizontal trunnion pin 20, the turning of which can be regulated by suitable adjusting nuts, as shown. An arm 21 has its rear end fixed to the pin 20 and extends forward therefrom to and past one of the side edges of the scale 5. There the arm 21 carries a suitable pointer 22 arranged at right-angles to the arm and operating over the front of the scale 5 in the upward and downward movements of the arm in response to the rising and falling of the bell 11 to indicate by the graduations on the scale 5 the relative height of the bell.

A relatively short arm 23 is fixed to the pin 20 and extends above the same in substantially right-angular relation to the long arm 21, as shown in Fig. 2. The upper or free end of the short arm 23 is pivotally connected, as at 24, with the rear or swinging end of a control link 25, which has its forward or opposite end pivoted at 26 to the bracket 8. The pivot 26 is above and offset slightly forward of the pivot mounting 9 by which the lever 7 is connected with said bracket.

To counterbalance the effective weight of the bell 11 in its up and down movements in response to pressure within the same, I provide an auxiliary counter-weight 27 at the lower end of an arm 28, which is rigid with and depends from the lever 7 below its pivotal mounting 9. The weight 27 and the arm 28 provide a gravity loading means on the lever, which loading means is in direct proportion to the force required to operate the lever 7. In other words, the loading means is swung on opposite sides of the fulcrum point 9 of the lever 7 as the bell is raised and lowered due to the increase or decrease of pressure within the same during the operation of the gauge, and the loading means by its position with respect to the lever returns the lever 7 to a position with the pointer at zero on the scale when there is no pressure action within the bell. The position of this loading means is such that it is swung to either side of the fulcrum 9 in direct proportion to the amount of force required to actuate the bell.

The device shown and described operates as follows. When used as a draft gage in furnace work, the scale 5 may be positioned in its frame 6 with the zero graduation at the upper end of the scale, as shown in Fig. 1. When the pressure in the flue or chamber with which the interior of the bell 11 is connected by the pipes 16 and 17 is at atmosphere, the pressure inside and outside of the bell 11 is the same and the bell stands in a position holding the long arm 21 at the limit of its upward movement with its pointer 22 at the zero mark at the upper end of the scale. When the chamber referred to is placed under a draft, a suction is created in the interior of the bell 11. This causes a rising of the liquid level in the bell and a lowering of the liquid level in the tank 13 outside of the bell. The result of this action is to increase the effective weight of the bell 11 on the lever 7 and overcome the counter-weights 18 and 27 to the extent of the decrease of pressure within the bell. The bell 11 thus moves downward until balanced by the counterweights. In this downward movement of the bell, the rear end of the lever 7 is moved downward carrying with it the arms 21 and 23. The action of the control link 25 is such that it turns the arms on their pivotal mounting 20 as the latter moves downward with the lever 7 and converts the arcuate movement of the lever 7 into a vertical straight line movement at the outer or pointer end 22 of the arm 21 at the scale 5 to indicate the condition of the draft.

Should the pressure of the draft be increased, the suction in the bell 11 would increase and the lever 7 and its connected parts would be moved further downward, carrying the pointer 22 further down on the scale 5 to indicate the condition of the draft, the link 25 continuing to turn the arms and causing its pointer 22 to be moved downward in a vertical straight line over the scale 5, as before. Under a decrease of pressure of the draft, the bell 11 would move upward, and the link 25 would turn the arms and cause the pointer 22 to maintain its straight line movement over the scale. This straight line movement of the pointer 22 is maintained throughout the entire limits of the upward and downward movements of the parts, and the scale 5 may thus be vertically straight instead of curved as would be required should the indicating arm 21 be turned about a fixed pivotal point as in draft gages as heretofore made and used. Thus my improved gage, by reason of this straight line movement of the pointer 22, may be accurately read regardless of the position of the pointer on the scale, as the pointer at no time moves away from the observer in a curved path as with gages as heretofore made. Moreover, this straight line movement of the pointer allows a straight, flat glass plate to be used over the sight opening in the box. These plates are very inexpensive and can be secured almost anywhere in case of breakage, and thus have a great advantage over specially prepared curved glass plates which must be employed with gages having arcuate movement as heretofore.

In further explanation of this straight line movement of the pointer 22, attention is called to the diagram in Fig. 6. There the parts of the mechanism are shown in full and dotted lines in three positions A, B, and C, namely, at the limits of their upper and lower movements and in a mid position, respectively.

When in the mid position A, the lever 7 and the indicator arm 21 are both horizontal and parallel, the arm 21 being in front of the lever 7 and extending on opposite sides of its pivotal point 9 with the pointer 22 at the outer end of the arm 21 at the vertical straight path of movement $x$. As the bell 11 moves up or down from this mid position, the pivotal mounting 20 of the indicating arm 21 will be moved forward in the arc $y$, thus tending to move the arm 21 forward a corresponding distance and carry its pointer 22 forward out of the desired straight line travel $x$, as indicated by the dotted lines $z$, $z$, should the arm 21 be maintained in a horizontal position. To counteract this tendency, the arm 21 is caused to be swung up or down as the case may be, about its pivotal mounting 20 by reason of the action of the control link 25 on the short arm 23. With the arms 21 and 23 rigidly connected in fixed angular relation, the swinging of the arm 23 by the link 25 in the up and down travel of the arms with the lever 7 swings the arms about their pivotal mounting 20 and so constantly changes the angular positions of the arms with respect to the lever 7 that the outer or pointer end 22 of the arm 21 is caused to be moved up and down in the straight line $x$ without at any time being projected forward out of said path by the lever 7. The parts are so proportioned and arranged that the pointer end 22 of the arm 21 travels in this straight line at a much greater distance than the movement of the bell 11, thereby greatly multiplying the movements of the bell and permitting a relatively large spacing of the graduations on the scale 5 to render the gage more easily readable, especially when placed at a distance above the floor of the furnace or gage room as often occurs in many places of installation. With the structure of my invention, the free or outer end of the arm 21 at the pointer 22 is given a regular and uniform movement over the scale throughout the full range of movement of the lever 7 regardless of the change of angularity of the lever with respect to a predetermined position, such as at A, in the swinging of the lever on opposite sides of that position.

To limit the up and down movements of the mechanism, upper and lower stops 29, 30 are provided in the casing 1 to the rear of the lever 7 and arm 21 and in the path of movement of a stud 31 carried by the lever either in line with or adjacent to the trunnion pin 20 at the rear end of the lever 7, as shown in Fig. 5. The stops 29, 30 are carried by a bracket 32 secured to the upright rear wall of the casing 1, as shown in Figs. 2 and 5.

The arm 21 has a rigid rear extension 33 on which is mounted a weight 34 to counterbalance the longer portion of the arm 21 on the opposite side of the pivotal mounting 20.

An electric lamp 35 is usually provided inside of the casing 1 to the rear of the scale 5 so as to illuminate the same when the gage is set in a dark or dim place, as often occurs in boiler and furnace rooms. A name-plate 36 may be provided at the lower end of the scale 5 below the graduations thereon to receive the data, such as the word "furnace," to indicate the particular use for which the scale is designed. When installed in a furnace or boiler room, the casing 1 is usually set in an opening made therefor either in the furnace setting or panel 37 (Fig. 2) with the front wall 2 of the casing outside of or flush with said wall so that the scale 5 is visible.

As best shown in Figs. 7 and 9, the liquid may be supplied to the tank 13 through a filling opening 38 made in the side wall 39 of the box or casing 1 above the upper edge of the tank 13. A screw cap 40 normally closes this opening. A liquid level indicator 41 is provided for the tank 13 on the outside of the box or casing 1. This indicator consists of a fitting which is inserted through the wall (39) of the box into the tank and has an upright portion extending above the tank, as shown. The upright portion has a removable screw cap 42, which is removed to note the height of the liquid therein and thus determine whether the tank 13 needs replenishing. The tank has a drain fitting 43, which has a closure cap 44, as shown in Figs. 7 and 8.

The multiplication of the movement of the bell 11 is regular and equal in extent throughout the movement of the indicator, thus avoiding the necessity of careful calibration on the scale 5, as is required with curved scales due to the various errors which are introduced in changing the upward and downward movements of a bell to the curved movement of an arcuate movable indicator, as heretofore. The several levers are accurately counterbalanced so that the bell 11 is free to be displaced in accordance with the pressure within it.

My improved indicator is reliable in its indications, it is easily installed in position to be accurately read from the floor in a boiler room, and it is so constructed that it will remain substantially permanently in proper operating condition.

The tank 13 has a lower portion 13ª of relatively small horizontal area for receiving the lower end of the bell 11 and is enlarged at its upper portion. This shape of tank is for the purpose of reducing to a desired minimum the amount of liquid required for the tank.

In Fig. 10, I have shown a multiple unit indicator embodying the movement of my invention. As illustrated, the scales 5 for the several units are arranged side by side, and as many units may be employed as desired. Of the various units the pointers 22 have straight line movements and the scales are suitably graduated, as shown. One scale may be used to indicate the pressure condition in the "uptake," another in the "furnace," another in "zone 1," and another in the "duct." Each unit has its bell 11 and associated mechanism as heretofore described. For the various bells, a single liquid receptacle or tank 45 is employed, as shown in Fig. 11. With the tank 45 being common to all the bells or units, only one tank is required for all the units, and thus only one filling opening 38 and only one drain 44 are required.

While I have shown and described my invention as applied to a draft gage for furnace work, it is to be of course understood that the movement of my gage may be employed for other purposes. Moreover, instead of a gasometer bell 11 for actuating the movement, I may employ any form of power as may be required or needed, such as bellows, diaphragms, motors, etc.

The graduations on the scale 5 of each unit have their major divisions 46 extending outward beyond the row of minor or subdivisions 47. The outer ends of the major graduations are made heavier than the minor graduations so that the former are more visible. With this arrangement the scale is rendered much more visible even from a distance and is much easier and more convenient to read. Moreover, the index numbers or characters 48 for the major graduations may be made larger and they will stand out more distinctly as the minor graduations are set back far enough from them so as not to lessen their visibility.

The details of structure and arrangement of parts shown and described may be variously changed and modified without departing from the spirit and scope of my invention.

I claim as my invention:

1. An indicator, comprising a pivoted operating lever, an arm pivotally connected at one end with the lever and having its other end free to serve as a pointer for the indicator, the pivotal connection between the arm and the lever moving with the lever in the swinging thereof, means acting on the arm in the swinging of the lever to so shift the arm about its pivotal connection with the lever that the arcuate movement of the lever is converted into a straight line movement for the free end of the arm, and means for moving the lever.

2. A pressure indicator, comprising a pivoted operating lever, an arm pivotally connected at one end with the lever and having its other end free to serve as a pointer for the indicator, the pivotal connection between the arm and the lever moving with the lever in the swinging thereof, means acting on the arm through its pivotal connection with the lever in the swinging thereof to so shift the arm about its pivotal connection with the lever that the arcuate movement of the lever is converted into a straight line movement for the free end of the arm, and pressure responsive means for moving the lever.

3. An indicator, comprising a pivoted operating lever, an arm pivotally connected at one end with the lever and having its other end free to serve as a pointer for the indicator, the pivotal connection between the arm and the lever moving with the lever in the swinging thereof, means acting on the arm in the swinging of the lever to so shift the arm about its pivotal connection with the lever that the arcuate movement of the lever is converted into a straight line movement for the free end of the arm and the latter is given a substantially uniform and regular movement throughout the full range of movement of the lever regardless of the change of angularity thereof with respect to a predetermined position.

4. An indicator, comprising a support, an operating lever fulcrumed thereon, an arm pivotally connected at one end with the lever and having its other end free to serve as a pointer for the indicator, the pivotal connection between the arm and the lever moving with the lever in the swinging thereof, a second arm disposed in fixed angular relation to the first arm and rigidly connected therewith adjacent the pivotal connection of the first arm with the lever, means carried by the support and cooperating with the second arm in the swinging of the first arm by the lever to so shift the first arm about its pivotal connection with the lever that the arcuate movement of the lever is converted into a straight line movement for the free end of the first arm, and means for moving the lever.

5. An indicator, comprising a support, an operating lever fulcrumed thereon, an arm pivotally connected at one end with the lever and having its other end free to serve as a pointer for the indicator, the pivotal connection between the arm and the lever moving with the lever in the swinging thereof, a second arm disposed in fixed angular relation to the first arm and rigidly connected therewith adjacent the pivotal connection of the first arm with the lever, a control link having one end pivoted to the support and the other end pivoted to the second arm to cause the first arm to be so shifted about its pivotal connection with the lever in the swinging thereof that the arcuate movement of the lever will be converted into a straight line movement for the free end of the first arm, and means for moving the lever.

6. An indicator, comprising a support, an operating lever fulcrumed between its ends on said support, an arm arranged to extend in the general direction of the length of the lever and operating in a plane substantially parallel to the plane in which the lever has movement, said arm having one end pivoted to one end of the lever and its outer end free and extending beyond the opposite end of the lever to serve as a pointer for the indicator, the pivotal connection between the arm and the lever moving with the lever in the swinging thereof, a second arm disposed in fixed angular relation to the first arm and rigidly connected therewith adjacent its pivotal connection with the lever, a control link having one end pivoted to the support and its other end pivoted to the second arm to cause shifting of the first arm about its pivotal connection with the lever in the swinging thereto to convert the arcuate movement of the lever into a straight line movement for the free end of the first arm, and means for moving the lever.

7. An indicator, comprising a support, an operating lever fulcrumed between its ends on said support, an arm arranged to extend in the general direction of the length of the lever and operating in a plane substantially parallel to the plane in which the lever has movement, said arm having one end pivoted to one end of the lever and its outer end free and extending beyond the opposite end of the lever to serve as a pointer for the indicator, the pivotal connection between said arm and the lever moving with the lever in the swinging thereof, a second arm disposed in fixed angular relation to the first arm and rigidly connected therewith adjacent its pivotal connection with the lever, a control link having one end pivoted to the second arm and disposed to extend toward the free end of the first arm where it is pivoted to the support in offset relation to the fulcrum of the lever, said link serving in the swinging of the lever to so shift the first arm about its pivotal connection with the lever to convert the arcuate movement of the lever into a straight line movement for the free end of the first arm, and means for moving the lever.

8. A pressure indicator, comprising a pivoted operating lever, an arm pivotally connected at one end with the lever and having its other end free to serve as a pointer for the indicator, the pivotal connection between the arm and the lever moving with the lever in the swinging thereof, means acting on the arm through its pivotal connection with the lever in the swinging thereof to so shift the arm about its pivotal connection with the lever that the arcuate movement of the lever is converted into a straight line movement for the free end of the arm, a scale over which the free end of the arm has movement, and a sealed gasometer bell connected with the lever for operating the same in response to pressure changes within the bell.

9. A mechanical movement, comprising a pivoted operating lever, an arm pivotally connected at one end with the lever and having its other end free and movable in a plane substantially parallel to the plane in which the lever has movement, the pivotal connection between the arm and the lever moving with the lever in the swinging thereof, and means acting on the arm in the swinging of the lever to so shift the arm about its pivotal connection with the lever that the arcuate movement of the lever is converted into a straight line movement for the free end of the arm.

10. In an indicator, a scale, and a pointer over the scale, said scale being provided with two rows of graduations arranged in side by side relation with the graduations in one row constituting the minor graduations and being greater in number than the graduations in the other row which constitute the major graduations, said major graduations being opposite certain of the minor graduations, terminating short of the same, and being greater in width than the minor graduations, all of which are less in width than the major graduations.

11. In an indicator, a scale in the form of a flat strip, and a pointer movable in a straight line over the scale, said scale being provided with two rows of graduations arranged in side by side relation with the graduations in one row constituting the minor graduations and being greater in number than the graduations in the other row which constitute the major graduations, said major graduations being opposite certain of the minor graduations, and having their inner ends terminating short of the same, said major graduations being greater in width than the minor graduations, all of which are less in width than the major graduations and index characters beyond the outer ends of the major graduations and made large enough to extend on opposite sides of the same.

12. An indicator, comprising a pivoted operating lever having a neutral position, an arm pivotally connected at one end with the lever and having its other end free to serve as a pointer for the indicator, a pivotal connection between the arm and the lever moving with the lever in the swinging thereof into and out of its neutral position, means acting on the arm in the swinging of the lever to so shift the arm about its pivotal connection with the lever that the arcuate movement of the lever is converted into a straight line movement for the free end of the arm, actuating means for the lever, and gravity loading means for the lever acting to return the same to its neutral position.

13. An indicator, comprising an operating lever fulcrumed between its ends, an arm pivotally connected at one end with the lever on one side of the fulcrum, and having its other end on the other side of the fulcrum and being free to serve as a pointer for the indicator, the pivotal connection between the arm and the lever moving with the lever in the swinging thereof, means acting on the arm in the swinging of the lever to so shift the arm about its pivotal connection with the lever that the arcuate movement of the lever is converted into a straight line movement for the free end of the arm, means for moving the lever and acting on the same at one side of the fulcrum, a counter-weight for said means and located on the lever on the other side of the fulcrum, and a weighted arm depending from the lever at its fulcrum to provide a gravity load for the lever.

14. A pressure indicator, consisting of a plurality of units, each having a pivoted operating lever and a pointer, and means connecting the pointer with the lever that the arcuate movement of the lever is converted into a straight line movement for the pointer, gasometer bells one for each lever and connected therewith for operating the same, and a single liquid containing tank for all the bells and common thereto.

15. A pressure indicator, comprising a plurality of units, each having a pointer and an actuating mechanism therefor, gasometer bells, one for each unit and connected with the actuating mechanism thereof for operating the same, and a single liquid-containing tank or receptacle for sealing the lower ends of all the bells and common thereto.

In testimony whereof I affix my signature this 13th day of April, 1927.

LEWIS M. ELLISON.